United States Patent

Fallmann et al.

[11] Patent Number: 6,079,735
[45] Date of Patent: Jun. 27, 2000

[54] ARRANGEMENT OF AN INFLATABLE LATERAL HEAD PROTECTION SYSTEM IN A MOTOR VEHICLE

[75] Inventors: Andreas Fallmann, Karlsfeld; Joerg Stavermann, Munich, both of Germany

[73] Assignee: Bayerische Motoren Werke Aktiengesellschaft, Germany

[21] Appl. No.: 09/161,475

[22] Filed: Sep. 28, 1998

Related U.S. Application Data

[63] Continuation of application No. PCT/EP97/00573, Feb. 10, 1997.

[30] Foreign Application Priority Data

Mar. 27, 1996 [DE] Germany .................. 196 12 229

[51] Int. Cl.[7] .................................................. B60R 21/22
[52] U.S. Cl. .................................................. 280/730.2
[58] Field of Search ........................ 280/730.2, 730.1, 280/743.1

[56] References Cited

U.S. PATENT DOCUMENTS

| | | | |
|---|---|---|---|
| 2,834,606 | 5/1958 | Bertrand .................. | 280/150 |
| 4,466,655 | 8/1984 | Baba et al. ................ | 296/214 |
| 4,948,168 | 8/1990 | Adomeit et al. .......... | 280/732 |
| 4,966,388 | 10/1990 | Warner et al. ............ | 280/730 |
| 5,163,730 | 11/1992 | Welch ....................... | 296/189 |
| 5,265,903 | 11/1993 | Kuretake et al. ......... | 280/730 |
| 5,322,322 | 6/1994 | Bark et al. ................ | 280/730 |
| 5,324,074 | 6/1994 | Christian et al. ......... | 280/728 R |
| 5,472,230 | 12/1995 | Every, Sr. et al. ........ | 280/728.2 |
| 5,480,181 | 1/1996 | Bark et al. ................ | 280/730.2 |
| 5,503,427 | 4/1996 | Ravenberg et al. ...... | 280/728.3 |
| 5,540,459 | 7/1996 | Daniel ....................... | 280/730.2 |
| 5,544,913 | 8/1996 | Yamanishi et al. ....... | 280/730.2 |
| 5,547,214 | 8/1996 | Zimmerman, II et al. | 280/730.1 |
| 5,588,672 | 12/1996 | Karlow et al. ............ | 280/730.2 |
| 5,602,734 | 2/1997 | Kithil ........................ | 280/735 |
| 5,605,346 | 2/1997 | Cheung et al. ........... | 280/728.2 |
| 5,651,582 | 7/1997 | Nakano .................... | 297/216 |
| 5,681,055 | 10/1997 | Green et al. .............. | 280/728.2 |
| 5,788,270 | 8/1998 | Haland et al. ............ | 280/729 |
| 5,791,683 | 8/1998 | Shibata et al. ........... | 280/730.2 |
| 5,921,576 | 7/1999 | Sinnhuber ................ | 280/730.2 |
| 5,924,722 | 7/1999 | Koide et al. .............. | 280/730.2 |

*Primary Examiner*—Brian L. Johnson
*Assistant Examiner*—Michael Britton
*Attorney, Agent, or Firm*—Evenson, McKeown, Edwards & Lenahan, P.L.L.C.

[57] ABSTRACT

An inflatable lateral head protection system of a passenger car, having an air bag which, via its end sections, is fastened to suitable points, particularly to the A-column as well as to the C-column. In the non-inflated condition, the air bag is covered following the course of the roof member between the A-column and the C-column. Various alternatives are provided for fastening the air bag on the roof member and for the covering. Either separate covering parts may be provided, they may form a preassembly unit together with the air bag, or the headlining of the vehicle interior may be constructed correspondingly in order to accommodate the air bag which is fastened, for example, via a VELCRO™ fastener system, to the roof member and which may be situated in a protective hose.

12 Claims, 4 Drawing Sheets

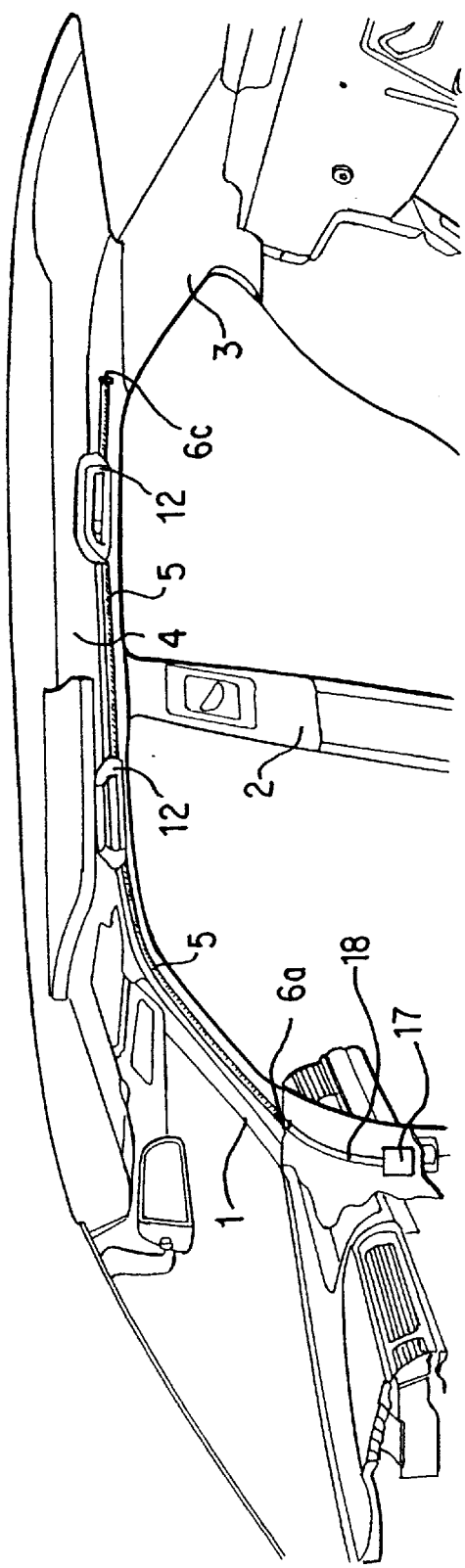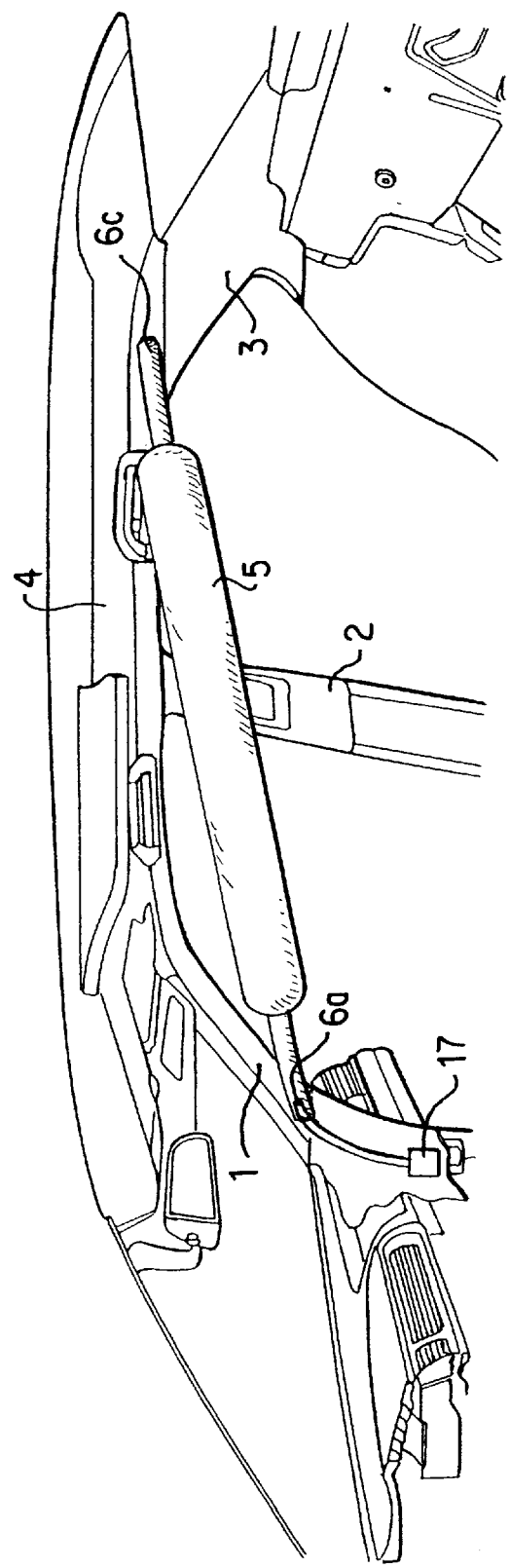

ARRANGEMENT OF AN INFLATABLE LATERAL HEAD PROTECTION SYSTEM IN A MOTOR VEHICLE

CROSS-REFERENCE TO RELATED APPLICATIONS

This application is a continuation under 35 U.S.C. 111(a) of PCT/EP97/00573, filed Feb. 10, 1997, WO 9700573 A3 and claims the priority of German Patent number DE19612229.A1 filed on Mar. 27, 1996, the disclosures of which are incorporated by reference herein.

This application is related to application Ser. No. 09/161,470 filed on Sep. 28, 1998 in the name of Joerg STAVERMANN for ARRANGEMENT OF AN INFLATABLE HEAD-PROTECTION SYSTEM IN A MOTOR VEHICLE and U.S. Pat. No. 5,988,673 filed on Sep. 28, 1998 in the name of Joerg STAVERMANN for INFLATABLE HEAD PROTECTION SYSTEM FOR THE LATERAL AREA OF A PASSENGER CAR.

BACKGROUND AND SUMMARY OF THE INVENTION

The invention relates to the arrangement of an inflatable lateral head protection system in a motor vehicle, having an air bag which is fastened at suitable points of the vehicle body via its end sections, particularly on the A-column as well as in the C-column area, and which, in the non-inflated condition, is covered following the course of the roof member essentially between the A-column and the C-column.

A head protection system of the type generally described above, particularly for a passenger car, is described in International Patent Document WO 94/19215; however, a use of such a system in series production is not yet known. In particular, that reference fails to disclose possibilities of arranging the air bag in the non-inflated condition on the vehicle body in a manner which is suitable for a series production as well as for optimal manufacture.

It is therefore an object of the invention to provide particularly advantageous arrangements of an air bag, particularly in the area of the roof member.

This and other objects have been achieved according to the present invention by providing an arrangement of an inflatable lateral head protection system in a motor vehicle with a vehicle body including a roof member, an A-column, and a C-column, and a vehicle interior headlining covering said roof member, said arrangement comprising: an air bag having end sections fastened to the vehicle body at least at a first point on the A-column and at a second point proximate the C-column, said air bag being covered in a non-inflated condition and essentially following a course of a roof member between the A-column and the C-column, said air bag being coupled to one of the roof member and the vehicle interior headlining.

This and other objects have been achieved according to the present invention by providing a method of making an inflatable lateral head protection system in a motor vehicle with a vehicle body including a roof member, an A-column, and a C-column, and a vehicle interior headlining covering said roof member, said method comprising the acts of: fastening end sections of an air bag to the vehicle body at least at a first point on the A-column and at a second point proximate the C-column; covering said air bag in a non-inflated condition such that said air bag essentially follows a course of a roof member between the A-column and the C-column; and coupling said air bag to one of the roof member and the vehicle interior headlining.

Other objects, advantages and novel features of the present invention will become apparent from the following detailed description of the invention when considered in conjunction with the accompanying drawings.

BRIEF DESCRIPTION OF THE DRAWINGS

FIG. 4 is a lateral view of the head protection system in the non-activated position;

FIG. 5 is a lateral view of the head protection system in an activated position.

DETAILED DESCRIPTION OF THE DRAWINGS

First, reference is made to FIG. 4. This is a lateral view of a vehicle interior of a motor vehicle or passenger car, in which, as customary, the vehicle body has an A-column 1, a B-column 2 as well as a C-column, and in which case, in addition to other vehicle body elements, a roof member 4 is provided which is linked to the end areas of the individual columns. This motor vehicle is provided with an inflatable lateral head protection system which essentially consists of an air bag 5 which is fastened at suitable points 6a, 6c of the vehicle body, specifically on the A-column 1 and in the area of the C-column 3. FIG. 5 shows this air bag 5 in the inflated condition; that is, when the lateral head protection system is activated or triggered, in which case it is clearly demonstrated that this air bag 5 forms a damping impact surface for a vehicle occupant's head.

In the non-activated, that is, in the non-inflated condition, the air bag 5 is arranged following the course of the roof member 4 essentially between the A-column 1 and the C-column 3, as illustrated in FIG. 4. FIG. 4 does not show a covering of the air bag 5 with respect to the vehicle interior which, however, is required, on the one hand, for holding the air bag 5 to follow the course of the roof member 4 and, on the other hand, for stylistic reasons. Various preferred embodiments of this covering as well as of the arrangement of the air bag 5, particularly on the roof member 4, are illustrated FIGS. 1 to 3 explained in the following. In this case, identical components will have the same reference numbers.

Figure 1:
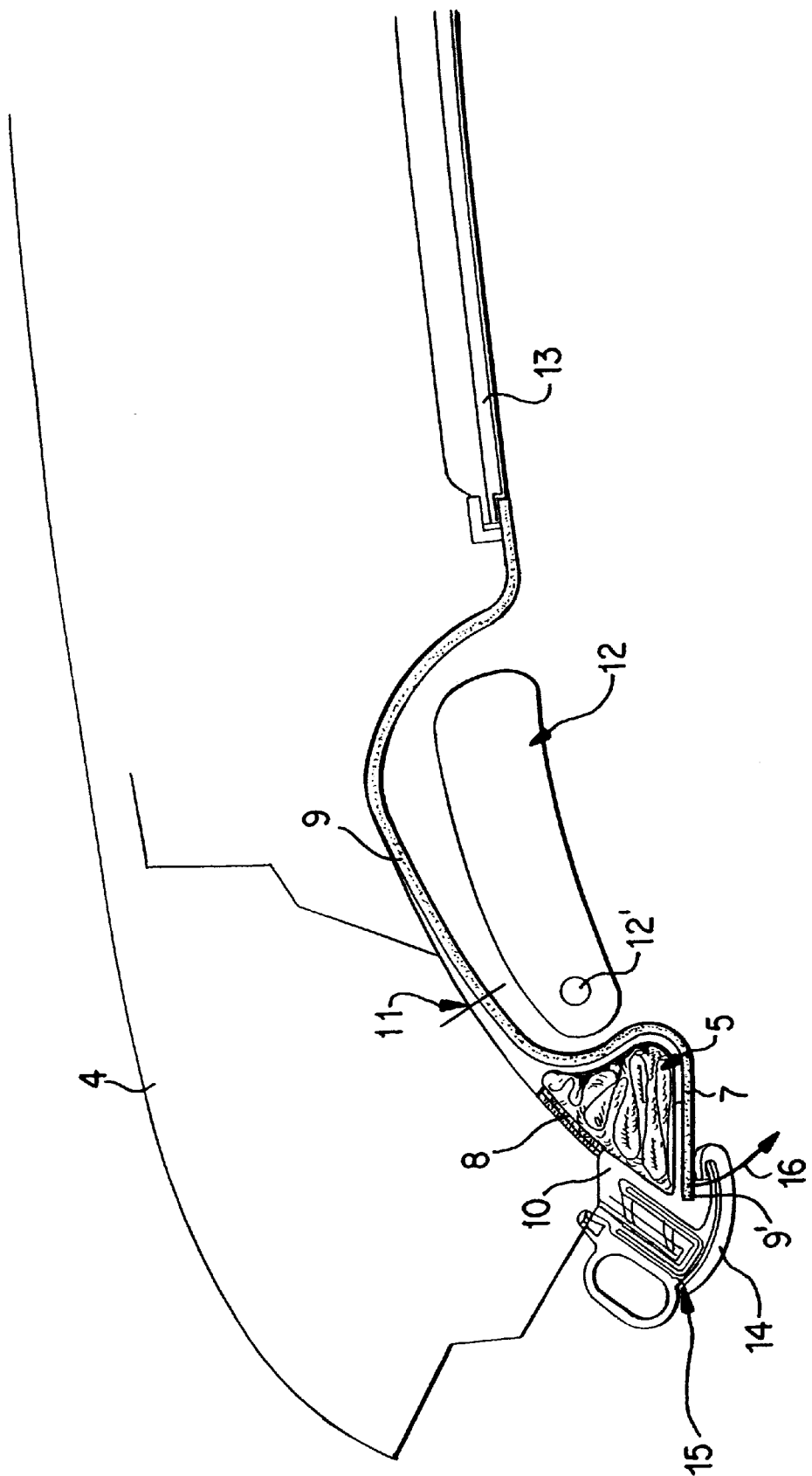
FIG. 1 is a partial cross-sectional view of a vehicle body in the roof member area according to a preferred embodiment of the present invention.

In the embodiment according to FIG. 1, the air bag 5 is wrapped in a flexible protective hose 7 which, in turn, is fastened directly to the roof member 4. This fastening of the protective hose 7 on the roof member 4 takes place here by way VELCRO™ fastener system 8, that is, via two known VELCRO™ strips (i.e., a nylon material which can be fastened to itself), of which one is fastened to the protective hose 7 and the other is fastened to the roof member 4. By pressing the protective hose 7 by means of its VELCRO™ strip to that of the roof member 4, the protective hose with the air bag is easily mountable on the roof member 4. In this case, the VELCRO™ fastener system may extend along the whole length of the roof member 4 as well as the partial area of the A-column 1 along which the air bag 5 is arranged to follow in the non-inflated condition (compare FIG. 4). However, it is also contemplated to provide the VELCRO™ fastener system 8 only at several points, particularly along the roof member 4.

Another contemplated alternative for fastening the air bag 5 with its protective hose 7 is to use suitable separate fastening elements. Since such fastening elements may be constructed as simple plastic preforms, which are known to a person skilled in the art, this type of fastening is not illustrated separately.

However, it is not only important to fasten the air bag 5 to the roof member 4, but the air bag 5 must, in addition, be covered toward the vehicle interior. For this purpose, the customary vehicle interior headlining 9 is constructed in a suitable manner; that is, the headlining 9 is shaped such that it forms a hollow space 10 with respect to the roof member 4 in which the air bag 5 can be situated together with its flexible protective hose 7.

In a customary manner, the headlining 9 is screwed to the vehicle body, specifically to the roof member 4. This screwed connection 11, which is illustrated only symbolically, is provided in the area of a holding grip 12 which is also illustrated in FIGS. 4, 5. As usual, the headlining 9 also has a corresponding depression for receiving the holding grip 12 which can be swivelled about an axis 12'.

The only partially illustrated headlining 9 has a cutout 13 for receiving a customary vehicle sliding roof; however, this area of the headlining 9 is not important here. What is significant here is the exterior end section 9' of the headlining 9 which is pushed under an edge covering 14 fastened to the roof member 4 and which here is a component of a door opening sealing device 15. At least in the area of this end section 9', the headlining 9 is so flexible that, when the head protection system is activated, that is, when the air bag 5 is inflated, this end section 9' is swivelled away according to the direction of the arrow 16 out of the edge covering 14 so that the air bag 5 expanding during the inflation can virtually peel out of the hollow space 10 in order to finally reach the position illustrated in FIG. 5.

In this context, it should be pointed out that the flexible protective hose 7 is naturally burst open during the inflation of the air bag 5. The same applies to the plastic preforms, which are not shown and by means of which the protective hose 7 instead of the VELCRO™ fastener system 8 can be fastened to the roof member 4, because these plastic preforms would otherwise block the corresponding expansion as well as the movement of the air bag 5. The gas generator having the reference number 17 in FIGS. 4, 5 is triggered by corresponding sensor signals, for example, as the result of a lateral crash of the motor vehicle, initiating the inflation of the air bag 5. For this purpose, the gas generator 17 is connected with the air bag 5 via a pressure hose 18.

Figure 2:
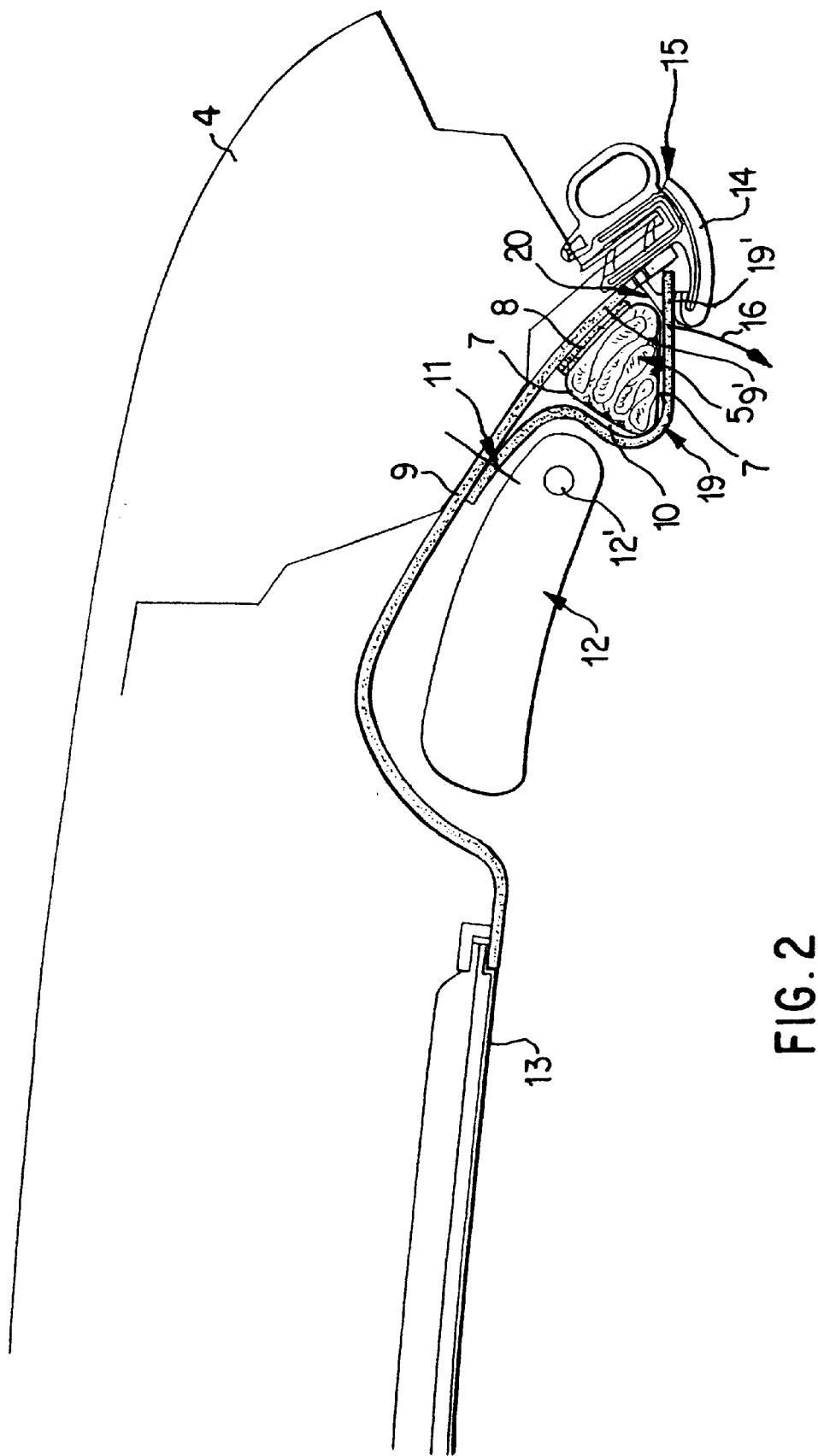
FIG. 2 is a partial cross-sectional view of a vehicle body in the roof member area according to another preferred embodiment of the present invention.

In the embodiment according to FIG. 2, the headlining 9 is constructed, as in a conventional passenger car, without a lateral head protection system which can be inflated according to the invention. Here, the air bag 5, which is again wrapped into a flexible protective hose 7, is fastened to the end section 9' of this headlining 9, specifically again by way of a VELCRO™ fastener system 8; however, a fastening via suitable plastic preforms is also contemplated. For covering the air bag 5 toward the vehicle interior, a separate covering part 19 is provided which is also shaped such that a hollow space 10 is formed for receiving the air bag 5 and which, together with the headlining 9 and resting upon it, is linked, optionally together with the holding grip 12, by way of a screwed connection 11 to the roof member 4. The exterior end section 19' of this covering part 19 is again fitted under an edge covering 14, which is a component of the door opening sealing device 15, in which case, in addition, a locking device 20 is provided between the covering part 19 and the headlining 9 in the form of interlace materials webs which are provided on the covering part 19 and can be fitted into a corresponding receiving device of the headlining 9. Again, at least the exterior end section 19' of the covering part 19 is constructed to be so flexible that, when the air bag 5 is inflated, this end section 19' is swivelled away in the direction of the arrow 16 so that the air bag 5 can peel out of the hollow space 10 in order to finally reach the position illustrated in FIG. 5.

Figure 3:
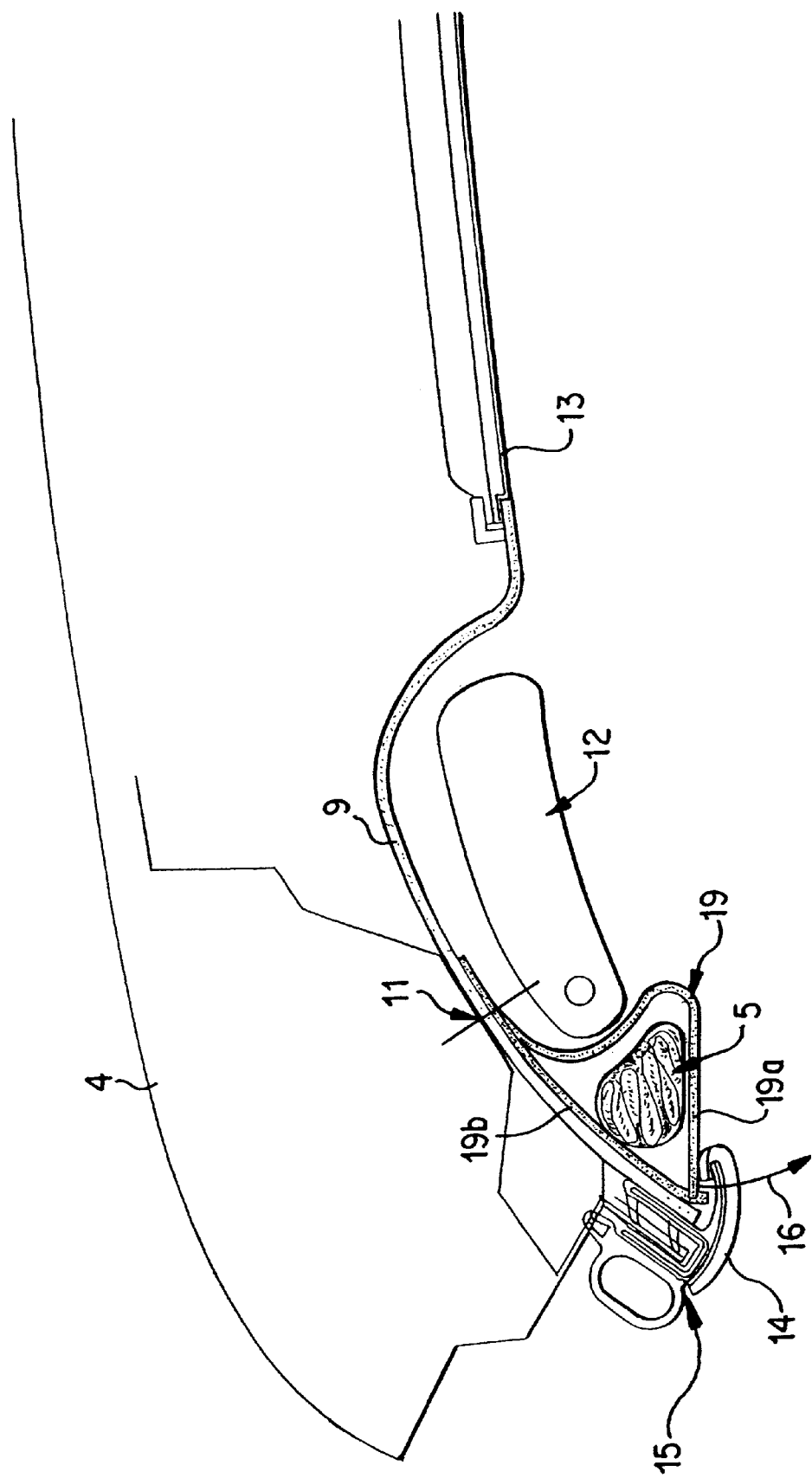
FIG. 3 is a partial cross-sectional view of a vehicle body in the roof member area according to another preferred embodiment of the present invention.

Also in the embodiment according to FIG. 3, the headlining 9, as in the case of a passenger car, is constructed in a customary manner without the head protection system according to the invention. Here, a separate covering part 19 is provided for the air bag 5 which, however, is constructed in the manner of a housing and in this case accommodates the air bag 5. This housing-type covering part 19 therefore has two walls 19a, 19b which, in areas, are spaced from one another and between which the hollow space is situated for accommodating the air bag 5. This housing-type, virtually tube-shaped covering part 19 therefore forms a preassembly unit together with the air bag 5, which may be wrapped in a flexible protective hose; that is, the covering part 19 according to FIG. 3 can be preassembled with the air bag 5 at a different point in the production process in order to later be housed as a complete unit in the vehicle body. In this case, the fastening to the vehicle body can take place analogously to the preceding embodiments by way of a screwed connection 11 together with the headlining 9 as well as resting on the latter at the roof member 4. A separate fastening of the air bag 5 or of the flexible protective hose inside the housing-type covering part 19 is not necessary in this case. Naturally, also in the case of this embodiment according to FIG. 3, the wall 19a of the covering part 19 facing the vehicle interior should have such a flexible construction that, when the air bag 5 is inflated, this wall, together with its end section fitted into the wall 19b, can be swivelled away in the direction of the arrow 16 in order to permit the air bag 5 to peel out of the hollow space 10 and finally reach the position illustrated in FIG. 5.

Although FIGS. 1 to 3 each only show the arrangement of the air bag 5 on or in the area of the roof member 4, the same design is contemplated also in that partial area of the A-column 1 in which, as illustrated in FIG. 4, the air bag 5 is provided following the course of the A-column 1. Here, the air bag 5 can therefore not be covered in the non-inflated condition, following the upper partial area of the A-column, also by the covering part 19 or another separate covering. All embodiments have in common that the air bag 5 can be mounted in a protected manner, specifically by means of the protective hose 7 or by means of the housing-type covering part 19, in a simple manner at reasonable cost and, in the non-inflated condition, is securely held on the roof member 4 or on the upper partial area of the A-column 1. The accommodation is extremely space-saving and furthermore permits a good tolerance compensation. The additional development expenditures are low and the ease of repair is high. A plurality of details, particularly of a constructive type, can naturally be designed to deviate from the indicated embodiments without leaving the contents of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement of an inflatable lateral head protection system in a motor vehicle with a vehicle body including a roof member, an A-column, and a C-column, and a vehicle interior headlining covering said roof member, said arrangement comprising:

an air bag having end sections fastened to the vehicle body at least at a first point on the A-column and at a second point proximate the C-column, said air bag being covered in a non-inflated condition and essentially following a course of a roof member between the A-column and the C-column, said air bag being coupled to one of the roof member and the vehicle interior headlining, wherein said air bag is wrapped in a protective hose and said air bag and said hose are covered in a separate covering.

2. An arrangement according to claim 1, wherein the air bag and the hose are fastened to the roof member and covered by the vehicle interior headlining.

3. An arrangement according to claim 2, wherein the air bag and the hose are fastened to the roof member via a hook and loop fastener system.

4. An arrangement of a head protection system according to claim 1, wherein the headlining is screwed to the vehicle body along with a holding grip.

5. An arrangement according to claim 1, wherein the air bag and the hose are fastened to the vehicle interior headlining.

6. An arrangement according to claim 5, wherein in said non-inflated condition, the air bag is covered, following a partial area of the A-column, by the separate covering part.

7. An arrangement according to claim 5, wherein the air bag and the hose are fastened to the vehicle interior headlining via a hook and loop fastener system.

8. An arrangement of a head protection system according to claim 5, wherein at least one of the separate covering part and the headlining is screwed to the vehicle body along with a holding grip.

9. An arrangement according to claim 1, wherein the separate covering part is a housing-type covering part which forms a preassembly unit and which is fastened to one of the roof member and the vehicle interior headlining.

10. An arrangement according to claim 9, wherein in said non-inflated condition, the air bag is covered, following a partial area of the A-column, by the housing-type covering part.

11. An arrangement of a head protection system according to claim 9, wherein at least one of the housing-type covering part and the headlining is screwed to the vehicle body along with a holding grip.

12. A method of making an inflatable lateral head protection system in a motor vehicle with a vehicle body including a roof member, an A-column, and a C-column, and a vehicle interior headlining covering said roof member, said method comprising the acts of:

wrapping an air bag in a flexible protective hose;

fastening end sections of an air bag to the vehicle body at least at a first point on the A-column and at a second point proximate the C-column;

covering said air bag and said flexible protective hose in a non-inflated condition such that said air bag essentially follows a course of a roof member between the A-column and the C-column; and coupling said air bag to one of the roof member and the vehicle interior headlining.

* * * * *